US010708875B2

(12) United States Patent
Zander et al.

(10) Patent No.: US 10,708,875 B2
(45) Date of Patent: Jul. 7, 2020

(54) FREQUENCY ERROR ESTIMATION DURING SPLIT REPETITIVE UPLINK MESSAGE TRANSMISSION

(71) Applicants: Sony Mobile Communications Inc., Tokyo (JP); Sony Corporation, Tokyo (JP)

(72) Inventors: Olof Zander, Södra Sandby (SE); Basuki Priyanto, Lund (SE); Martin Beale, Surrey (GB); Shin Horng Wong, Surrey (GB)

(73) Assignee: SONY CORPORATION, Tokyo (JP)

(*) Notice: Subject to any disclaimer, the term of this patent is extended or adjusted under 35 U.S.C. 154(b) by 50 days.

(21) Appl. No.: 16/085,062

(22) PCT Filed: Apr. 1, 2016

(86) PCT No.: PCT/EP2016/057270
§ 371 (c)(1),
(2) Date: Sep. 14, 2018

(87) PCT Pub. No.: WO2017/157480
PCT Pub. Date: Sep. 21, 2017

(65) Prior Publication Data
US 2019/0082412 A1 Mar. 14, 2019

(30) Foreign Application Priority Data
Mar. 15, 2016 (WO) .................. PCT/EP2016/055608

(51) Int. Cl.
H04W 56/00 (2009.01)
H04W 4/70 (2018.01)
(Continued)

(52) U.S. Cl.
CPC ......... H04W 56/0035 (2013.01); H04W 4/70 (2018.02); H04W 24/10 (2013.01);
(Continued)

(58) Field of Classification Search
CPC ......... H04W 56/0035; H04W 56/0015; H04W 74/0833; H04W 72/0453; H04W 72/042;
(Continued)

(56) References Cited

U.S. PATENT DOCUMENTS

2014/0146697 A1* 5/2014 Kim ..................... H04B 7/0413
370/252
2016/0219587 A1* 7/2016 Lin ......................... H04W 4/70
(Continued)

FOREIGN PATENT DOCUMENTS

WO 2014053885 A1 4/2014
WO 2015192885 A1 12/2015

OTHER PUBLICATIONS

International Search Report and Written Opinion from counterpart International Patent Application No. PCT/EP2016/057270, dated Jan. 23, 2017; 17 pages.

Primary Examiner — Min Jung
(74) Attorney, Agent, or Firm — Tucker Ellis LLP

(57) ABSTRACT

A half-duplex radio device (100) generates a repetitive transmission of an uplink message to a base station (150) of the cellular network. The radio device (100) splits the repetitive transmission of the uplink message into a sequence of multiple transmit periods and configures at least one measurement gap between the transmit periods. In the transmit periods, the radio device (100) sends the repetitive transmission to the base station. In the at least one measurement gap configured between the transmit periods, the radio device (100) temporarily switches to receiving at least one downlink signal from the base station (150). Based on the received at least one downlink signal, the radio device (100) estimates a frequency error of a reference frequency source of the radio device (100).

17 Claims, 8 Drawing Sheets

(51) Int. Cl.
*H04W 24/10* (2009.01)
*H04W 72/04* (2009.01)
*H04W 74/08* (2009.01)

(52) U.S. Cl.
CPC ..... *H04W 56/0015* (2013.01); *H04W 72/042* (2013.01); *H04W 72/0453* (2013.01); *H04W 74/0833* (2013.01)

(58) Field of Classification Search
CPC ......... H04W 24/10; H04W 4/80; H04W 4/70; H04L 5/0048
See application file for complete search history.

(56) References Cited

U.S. PATENT DOCUMENTS

2016/0242058 A1* 8/2016 Kazmi .................... H04L 5/001
2017/0094562 A1* 3/2017 Zander .................... H04J 11/00

* cited by examiner

FREQUENCY ERROR ESTIMATION DURING SPLIT REPETITIVE UPLINK MESSAGE TRANSMISSION

FIELD OF THE INVENTION

The present invention relates to methods of controlling radio transmission in a cellular network and to corresponding devices.

BACKGROUND OF THE INVENTION

In cellular networks, such as a cellular network based on the LTE (Long Term Evolution) radio technology specified by 3GPP ($3^{rd}$ Generation Partnership Project), it is typically required that a frequency utilized by a radio receiver/transmitter in a user equipment (UE) matches a frequency utilized by a radio receiver/transmitter in a base station of the cellular network, in the LTE radio technology referred to as eNB (evolved Node B). To meet this requirement, the UE may perform frequency error measurements based on reference signals transmitted by the base station. In the LTE radio technology, these frequency error measurements are typically performed on cell-specific reference symbols (CRS) which are distributed over a wide frequency band of up to 20 MHz.

One aspect of the LTE radio technology specifically addresses Machine Type Communications (MTC) and a corresponding class of UEs, referred to as MTC device, as well as specific features to support efficient MTC, have been defined on both the network side and the UE side. A specific variant of MTC is referred to as NB-IoT (Narrow Band Internet of Things). One target of MTC and NB-IoT is to enable low-cost and/or low complexity radio devices with low-power consumption and extended coverage. This is typically achieved by limiting the MTC or NB-IoT devices with respect to their capability to utilize the full bandwidth and high data rates supported by the LTE radio technology. For example, an MTC device may be operated in a narrow frequency band of 1.4 MHz. This operation is also referred to as narrowband LTE. In the case of NB-IoT (Narrow Band Internet of Things), the utilized bandwidth can be even as small as 200 kHz.

To reduce cost and complexity, NB-IoT and MTC radio devices may use low cost oscillators, e.g., a Digital Controlled Crystal Oscillator (DCXO) or free-running crystal oscillator (XO), as a local oscillator or more generally a frequency reference source for operating the radio receiver/transmitter. However, such low cost oscillators may have more imperfections than more accurate and costly oscillators. For example, the oscillators may be limited with respect to the stability of their output frequency over temperature. Further, the NB-IoT and MTC radio devices may support only half-duplex transmission, which means that they are not capable of receiving and transmitting at the same time.

The NB-IoT technology may also be used to support different coverage ranges, referred to as normal coverage, extended coverage, and extreme coverage. In the case of extreme coverage, a data rate of at least 300 bps can be supported. Typical message sizes of NB-IoT applications are in the range of a few 100 bytes. For example, according to 3GPP TR 45.820, a mobile autonomous reporting (MAR) application has a packet size of up to 200 bytes, which will eventually be conveyed in one or more transport blocks. By way of example, assuming a maximum transport block size of 1000 bits in the uplink direction and 300 bps data rate then it will take around 3.3 seconds to transmit each transport block. Such a condition sets a challenge for meeting specified frequency error requirements, which are typically ±0.1 ppm as, because with increased duration of the uplink transmission, also the risk of higher frequency errors increases, the UE not being able to compensate for its frequency errors, since it is not able to receive DL signals in order to estimate its frequency error. Such frequency errors can for example be introduced by a temperature change, e.g., due to self-heating of a power amplifier during long continuous transmissions. An excessive frequency error can in turn introduce inter-carrier interference (ICI) at the eNB and can significantly degrade transmission performance, e.g., in terms of throughput.

Accordingly, there is a need for techniques that allow for efficiently estimating frequency errors of a reference frequency source used by a radio device operated in half-duplex mode.

SUMMARY OF THE INVENTION

According to an embodiment, a method of controlling radio transmission in a cellular network is provided. According to the method, a half-duplex radio device generates a repetitive transmission of an uplink message to a base station of the cellular network. The radio device splits the repetitive transmission of the uplink message into a sequence of multiple transmit periods and configures at least one measurement gap between the transmit periods. The size of the transmit periods may be limited to 1 sec or less, e.g., 500 msec, 200 msec, or 100 msec. In the transmit periods, the radio device sends the repetitive transmission to the base station. In the at least one measurement gap configured between the transmit periods, the radio device temporarily switches to receiving at least one downlink signal from the base station. Based on the received at least one downlink signal, the radio device estimates a frequency error of a reference frequency source of the radio device.

According to an embodiment, the radio device may also receive downlink control information from the base station in the at least one measurement gap. The downlink control information may be received on a downlink control channel, e.g., a PDCCH (physcial pownlink control channel) or NB-PDCCH (narrowband physcial downlink control channel).

The downlink control information may comprise acknowledgement information for acknowledging successful receipt of the uplink message. In response to the acknowledgement information indicating that the uplink message was successfully received by the base station, the radio device may terminate the repetitive transmission of the uplink message.

In addition or as an alternative, the downlink control information may also comprise a pause indicator. In response to receiving the pause indicator, the radio device may suspend the repetitive transmission of the uplink message. The pause indicator may alternatively or additionally indicate the time at which the radio device should recommence transmission of the uplink message. Alternatively or additionally, sending of the repetitive transmission of the uplink message can be recommenced by the radio device upon reception of a resume indicator which may be received from the base station. The resume indicator may be communicated using the downlink control information, e.g., on the NB-PDCCH, or by other suitable means.

According to an embodiment, the radio device may receive configuration information defining the at least one measurement gap from the base station, e.g., in terms of position and/or duration. The configuration information may be received explicitly or implicitly. According to an embodiment, the radio device may receive a downlink control channel from the base station and configure a duration of the at least one measurement gap depending on the downlink control channel, e.g., the NB-PDCCH. For example, the duration of the at least one measurement gap could then depend on a number of repetitions of a search space for transmission of the downlink control channel, in particular a part of the search space which is used to schedule transmission of the uplink message.

In addition or as an alternative, the radio device may also determine a frequency drift of the reference frequency source, e.g., based on previous estimations of the frequency error and/or on characteristics of the reference frequency source, and configure a duration of the transmit periods (or distance between consecutive measurement gaps) depending on the frequency drift.

According to an embodiment, a method of controlling radio transmission in a cellular network is provided. According to the method, a base station of the cellular network sends at least one downlink signal to a half-duplex radio device. Further, the base station receives a repetitive transmission of an uplink message from the half-duplex radio device. The repetitive transmission of the uplink message is split into a sequence of multiple transmit periods, and at least one measurement gap is configured between the transmit periods. In this measurement gap, the radio device temporarily switches to receiving at least one downlink signal from the base station for estimating a frequency error of a reference frequency source of the radio device. The size of the transmit periods may be limited to 1 sec or less, e.g., 500 msec, 200 msec, or 100 msec.

According to an embodiment, in reception processing for receiving the uplink message, the base station may disregard signals received in the at least one measurement gap.

According to an embodiment, in the at least one measurement gap, the base station sends downlink control information to the radio device. The downlink control information may be sent on a downlink control channel, e.g., a PDCCH or NB-PDCCH. The downlink control information may comprise acknowledgement information for acknowledging successful receipt of the uplink message by the base station. In this case, the base station may terminate the repetitive transmission of the uplink message by configuring the acknowledgement information to indicate that the uplink message was successfully received by the base station. In addition or as an alternative, the downlink control information may also comprise a pause indicator for causing the radio device to suspend the repetitive transmission of the uplink message. While the repetitive transmission of the uplink messages is suspended, the base station may reallocate uplink radio resources assigned to transmission of the uplink message.

According to an embodiment, the base station may coordinate the at least one measurement gap with one or more signals transmitted by one or more other radio device, e.g., with signals conveying uplink data, with reference signals, and/or with signals of a random access procedure.

According to an embodiment, in the at least one measurement gap, the base station may schedule transmission of an uplink message by another radio device.

According to an embodiment, the base station may send configuration information defining the at least one measurement gap to the radio device, e.g., in terms of position and/or duration. The configuration information may be transmitted explicitly or implicitly. According to an embodiment, the base station may configure a duration of the at least one measurement gap by sending a downlink control channel to the radio device, e.g., the NB-PDCCH. For example, the duration of the at least one measurement gap could then depend on a number of repetitions of a search space for transmission of the downlink control channel, in particular a part of the search space which is used to schedule transmission of the uplink message.

According to an embodiment, the base station may determine a frequency drift of the reference frequency source of the radio device, e.g., based on previous estimations of the frequency error reported by the radio device and/or on characteristics of the reference frequency source indicated to the base station. The base station may then configure a duration of the transmit periods (or distance between consecutive measurement gaps) depending on the frequency drift.

According to a further embodiment, a radio device is provided. The radio device comprises a half-duplex radio interface for connecting to a cellular network and a reference frequency source. Further, the radio device comprises one or more processors configured to:
  generate a repetitive transmission of an uplink message to a base station of the cellular network;
  split the repetitive transmission of the uplink message into a sequence of multiple transmit periods and configure at least one measurement gap between the transmit periods;
  in the transmit periods, send the repetitive transmission to the base station;
  in the at least one measurement gap configured between the transmit periods, temporarily switch the half-duplex interface to receiving at least one downlink signal from the base station; and
  based on the received at least one downlink signal, estimate a frequency error of the reference frequency source.

In particular, the at least one processor of the radio device may be configured to perform the steps as performed by the half-duplex radio device in the above-mentioned method.

According to a further embodiment, a base station for a cellular network is provided. The base station comprises a radio interface to a half-duplex radio device. Further, the base station comprises one or more processors configured to:
  send at least one downlink signal to the half-duplex radio device;
  receive a repetitive transmission of an uplink message from the half-duplex radio device,
  the repetitive transmission of the uplink message being split into a sequence of multiple transmit periods and at least one measurement gap being configured between the transmit periods, in which measurement gap the radio device temporarily switches to receiving the at least one downlink signal from the base station for estimating a frequency error of a reference frequency source of the radio device.

In particular, the at least one processor of the base station may be configured to perform the steps as performed by the base station in the above-mentioned method.

In embodiments of the above methods, radio device, or base station, the uplink message may correspond to a transport block conveyed on a physical layer transport channel. The transport block may be mapped to a set of multiple redundancy versions and each of the transmit periods may comprise a subset of one or more of the redundancy versions. Alternatively, each of the transmit periods may comprise a transport block conveyed on a physical layer transport channel.

In embodiments of the above methods, radio device, or base station, the at least one downlink signal may comprise a broadcast signal conveying system information. The base station may repeatedly transmit at least a part of the broadcast signal to enable estimation of the frequency error based on the repeated part of the broadcast signal. Accordingly, the radio device may estimate the frequency error based on a repeated transmission of at least a part of the broadcast signal. For example, the system information may be transmitted in multiple versions, at least one of the versions may be transmitted repeatedly, and the radio device may estimate the frequency error based on the part of the broadcast signal which corresponds to the repeated transmission of the at least one version. In one example of the multiple versions, a rate 1/3 convolutional code is used to encode a MIB—e.g., transmitted on NB-PBCH—and each one of the multiple version may comprise the parity bits produced by one generator polynomial of the convolutional code. Alternatively or in addition, the at least one downlink signal may comprise at least one of a synchronization signal and a reference signal.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to a scenario in which a radio device applies a carrier frequency for data transmission between the radio device and a base station of the cellular network, which may deviate from a frequency of a carrier signal as received from the base station, although these two frequencies should be nominally the same. Such frequency error may relate to temperature dependent variations of characteristics of a reference frequency source, e.g., a local oscillator, from which the carrier frequency is derived by the radio device. In other examples, the frequency error could be due to aging of the oscillator, to phase noise, to radio channel variations, and/or to Doppler shifts arising from movement of the radio device relative to the base station. The illustrated concepts aim at efficiently estimating such frequency error, which in turn allows for compensating the frequency error, e.g., by tuning the oscillator from which the carrier frequency is derived and/or by taking into account the frequency error in signal processing performed by the radio device and/or base station.

In the embodiments as illustrated in the following, it is assumed that the radio device is an MTC device operated in a cellular network based on the LTE radio technology, in particular the radio device may be an NB-IoT radio device. However, it is to be understood that the illustrated concepts could also be applied in connection with other types of radio devices and/or radio technologies.

Figure 1:
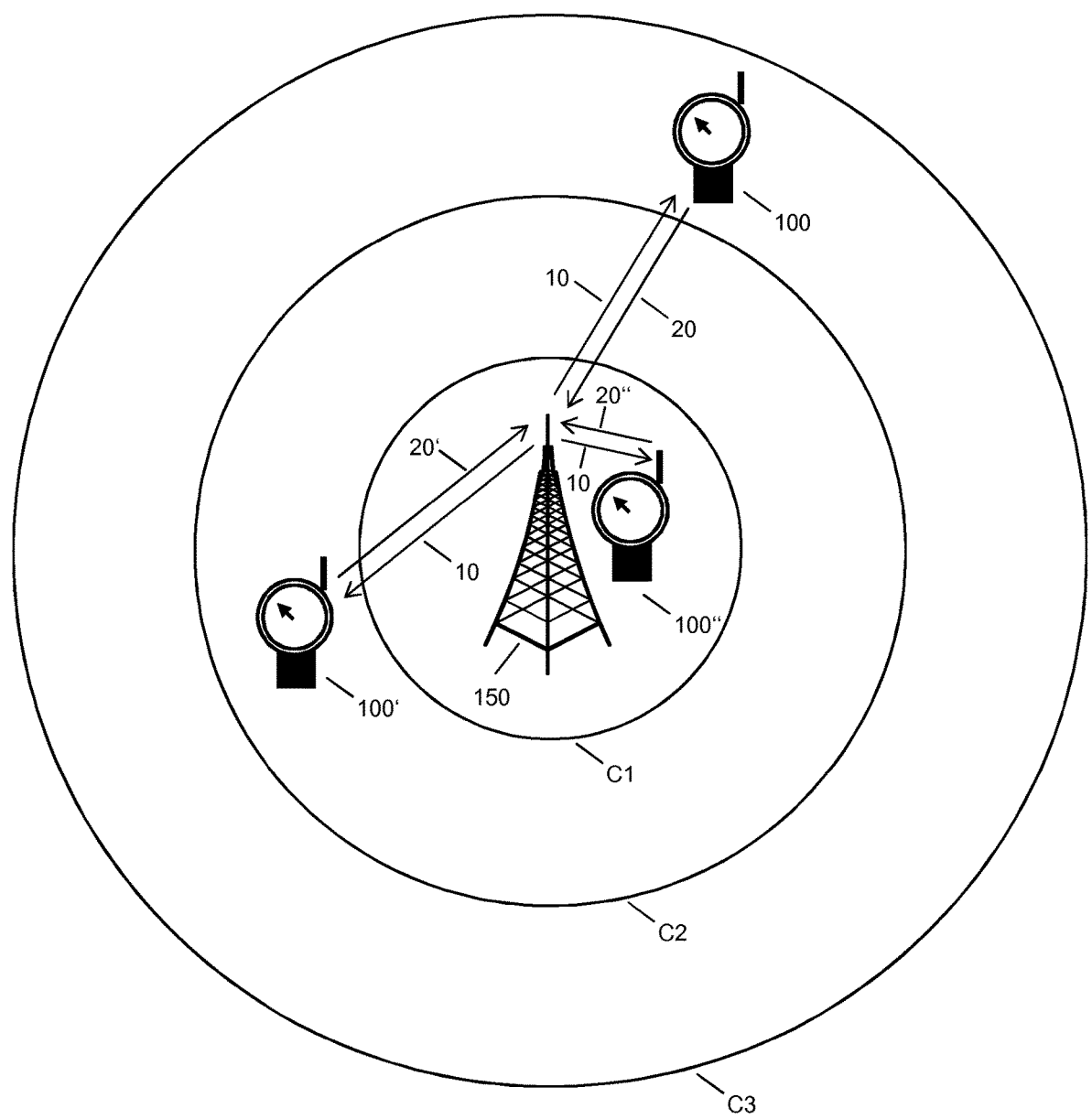
FIG. 1 schematically illustrates a cellular network system according to an embodiment of the invention.

FIG. 1 schematically illustrates a cellular network system according to an embodiment. Specifically, FIG. 1 shows MTC radio devices 100, 100', 100" and a base station 150, in accordance with the assumed utilization of the LTE radio technology in the following also referred to as eNB. The radio device 100 is assumed to be an NB-IoT radio device. As illustrated, a cell served by the base station 150 may provide different coverage ranges C1, C2, C3. In the illustrated scenario, the coverage range C1 is assumed to correspond to normal coverage, the coverage range C2 is assumed to correspond to extended coverage, and the coverage range C3 is assumed to correspond to extreme coverage as supported by NB-IoT. The extreme coverage may be achieved by using a robust modulation and coding scheme and repetitive transmissions. However, this may limit the achievable data rate, e.g., to values as low as 300 bps.

As illustrated, the radio devices 100, 100', 100" each may receive downlink (DL) signals 10 from the eNB 150. These downlink signals may for example include a broadcast channel conveying at least parts of system information, such as an NB-PBCH (narrowband physical broadcast channel) of the LTE radio technology. The NB-PBCH may convey the Master Information Block, which is part of system information. Alternatively or in addition, the DL signals may 10 also include synchronization signals, such as a PSS (Primary Synchronization Signal) or SSS (Secondary Synchronization Signal) of the LTE or NB-IoT radio technology. Further, the DL signals 10 may also include reference signals, such as CRS of the LTE radio technology or the NB-RS of NB-IoT. On the basis of the downlink signals 10, the radio devices 100, 100', 100" can access the cell of the eNB 150 and send uplink (UL) messages 20, 20', 20" to the eNB 150, e.g., on a PUSCH (Physical Uplink Shared Channel) or NB-PUSCH. These UL messages 20, 20', 20" are each conveyed in one or more transport blocks defined on a physical layer. As mentioned above, in the case of the radio device 100, the extreme coverage range C3 involves repeatedly transmitting the UL message 20 so that the eNB 150 may perform averaging over multiple received repetitions of the same data and thereby improve its reception performance.

In the scenario of FIG. 1, the radio device 100 is assumed to be an NB-IoT radio device operating in half-duplex mode, which means that it is not capable of transmitting and receiving at the same time.

Figure 2:
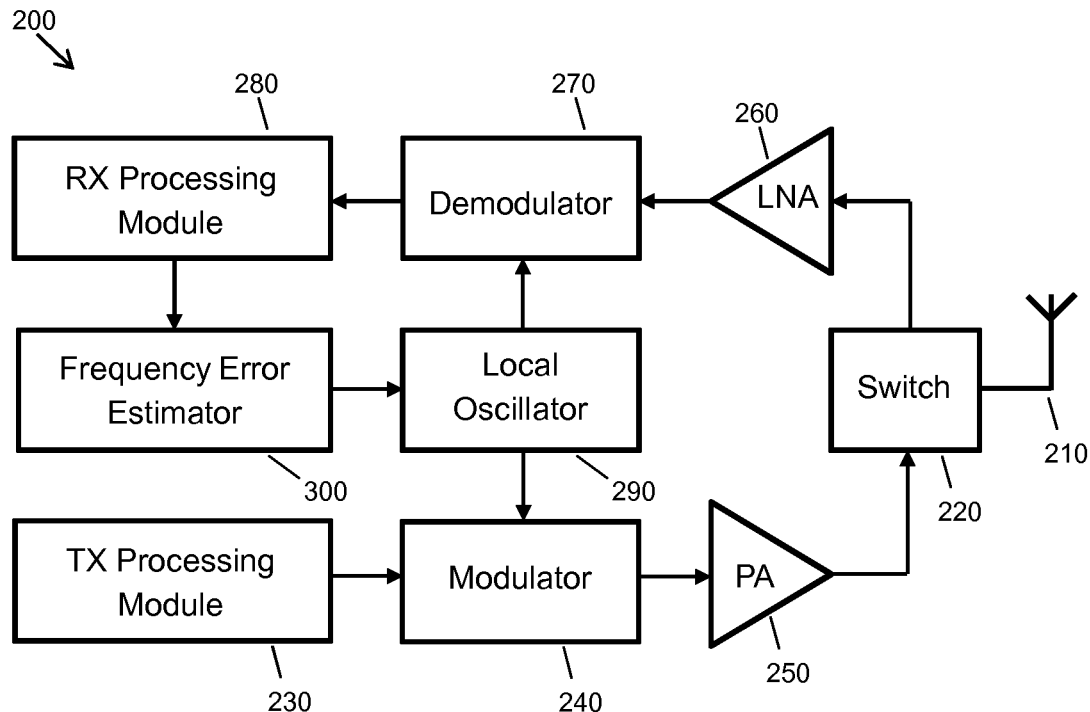
FIG. 2 shows an example of a half-duplex transceiver architecture which may be used in a radio device according to an embodiment of the invention.

FIG. 2 shows a block diagram schematically illustrating a half-duplex transceiver 200 which may be utilized in the radio device 100. The transceiver 200 may for example support the HD-FDD (Half-Duplex Frequency Division Duplex) mode of the LTE radio technology. As illustrated, the transceiver 200 includes an antenna 210, a switch 220 arranged in proximity of the antenna 210, a transmit path including a TX (transmit) processing module 230, a modulator 240, and a power amplifier (PA) 250, and a receive path including a low noise amplifier (LNA) 260, a demodulator 270, and an RX (receive) processing module 280. Further, the transceiver 200 includes a local oscillator 290 which provides a local carrier signal of a given frequency to the modulator 240 and to the demodulator 270.

By means of the switch 220, it can be selected whether the antenna 210 transmits UL signals provided by the transmit path, i.e., by the PA 250, or DL signals received by the antenna 210 are supplied to the receive path, i.e., to the LNA 260. The first option corresponds to UL operation of the transceiver 200, and the second option corresponds to DL operation of the transceiver 200. In a transceiver architecture as illustrated in FIG. 2, it is not possible for DL signals to be received while at the same time transmitting UL signals.

In UL operation, the TX processing module 230 generates a baseband signal to be transmitted in the UL direction to the eNB 150. For this purpose, that TX processing module 230 may implement various functions, such as UL physical channel processing, UL transport channel processing, and coding, IFFT (Inverse Fast Fourier Transform), or the like. The baseband signal from the TX processing module 230 is then modulated by the modulator 240. For this purpose, the modulator 240 includes a mixer which operates on the basis of a local carrier signal generated by the local oscillator 290 and converts the baseband signal to the radio frequency range. In this way, the modulator 240 may modulate the baseband signal onto one or more carrier signals, e.g., having frequencies in the range of a few GHz. The modulated signal is then supplied to the PA 250 for amplification and then transmitted as UL signal by the antenna 210.

In DL operation, the LNA 260 receives and amplifies the DL signals from the antenna 210. The amplified signal from the LNA 260 is demodulated by the demodulator 270. One of the components of the demodulator 270 is a mixer. The mixer downconverts the signal from the LNA 260 to a baseband signal. This downconversion is based on a local carrier signal produced by the local oscillator 290. The RX processing module 280 may then perform various functions on the baseband signal, such as FFT (Fast Fourier Transform), decoding, DL physical channel processing, DL transport channel processing, channel estimation, or the like.

As illustrated, the transceiver of 200 also includes a frequency error estimator 300 which operates on the basis of the DL signals received by the transceiver 200. In the illustrated example, the frequency error estimator 300 receives one or more output signals from the RX processing module 280. These output signals may for example indicate characteristics of certain DL signals which are suitable for frequency error estimation, e.g., characteristics of a broadcast channel, such as a PBCH, characteristics of synchronization signals, such as PSS or SSS (or NB-PSS/NB-SSS), characteristics of reference signals, such as CRS or NB-RS (Narrowband Reference Signals). The frequency error estimator 300 estimates a frequency error of the local oscillator 290, e.g., in terms of a frequency offset with respect to the frequency of a carrier signal conveying the received DL signals. The estimated frequency error is applied for controlling the local oscillator 290 in such a way that the frequency error is compensated for. This may involve adjusting the local oscillator 290 by increasing or decreasing its output frequency, depending on the estimated frequency error. Accordingly, by monitoring the received DL signals, the transceiver can control the frequency of the local carrier signal used for transmission of the UL signal in such a way that stability within specified tolerance limits can be achieved. Hence, the transceiver 200 provides a feedback loop based on the received DL signal that controls the output frequency of the local oscillator 290 to compensate frequency errors. However, in the case of continuous transmission of the UL signals over a long duration, this ability of compensating frequency errors may be impaired.

As a general rule, a frequency error of the respective local oscillator used by the radio device 100, 100', 100" may occur during the transmission of the UL message 20, 20', 20". In the case of the radio devices 100', 100", which support higher data rates than the radio device 100, such frequency errors are less critical because the higher data rates may allow for finishing transmission of the UL message 20', 20" before the frequency error exceeds a specified limit. Further, the radio devices 100', 100" may also support full duplex operation, i.e., transmit and receive at the same time, so that the frequency error can be estimated based on the downlink signals and compensated for while transmission of the UL message 20', 20" continues.

When the UL message 20 transmitted by the radio device 100 has a size of 1000 bits and is based on a data rate of 300 bps then it will take around 3.3 seconds to transmit the UL message 20. This sets a challenge for meeting low frequency error requirements, e.g., of ±0.1 ppm, since the local oscillator of the radio device 100 may lack sufficient frequency stability. On the other hand, since the radio device 100 operates in half-duplex mode, it cannot transmit and receive at the same time. This has the effect that the radio device 100 cannot estimate and compensate the frequency error while continuing with transmission of the UL message 20.

The radio devices 100, 100, 100" may track the above-mentioned frequency error. In this way, for example a temperature variation may be taken into account. Such temperature variations may cause variations of a frequency of the local oscillator used in the radio device 100, 100', 100" for deriving the carrier frequency on which the radio transmissions are based. Such frequency variations may depend in a non-linear manner on the temperature. Thus, even if the temperature could be measured, it would be difficult to precisely predict the frequency error. In a typical scenario, the temperature of the radio device 100, 100', 100" may vary at a rate of up to 1° C./sec, and the associated frequency error of a crystal oscillator (XO) can be up to 0.6 ppm/° C. This frequency error can be specifically problematic in the case of the radio device 100, which is assumed to be an NB-IoT radio device operating in half-duplex mode and at a data rate which can be as low as 300 bps, which means that even when assuming a moderate size of the UL message 20 of 1000 bits, the transmission duration of the UL message would be 3.3 sec. By way of example assuming a carrier frequency of 2 GHz, the frequency error can thus be up to 2 kHz within the 3.3 sec transmission duration of the UL message 20 by the radio device 100.

In the LTE radio technology, CRS may generally be utilized for tracking the frequency offset. However, in the case of narrowband LTE as for example used for MTC, only a limited number of CRS can be received by the MTC radio device 100, 100', 100", which may result in an increased error of the estimated frequency offset. Such problems may be further enhanced when a low SNR (Signal to Noise) operation for extended coverage is selected (e.g. based on an extended coverage extension of 15 dB, or an extreme coverage extension of 20 dB). In the concepts as described herein, the MTC radio device 100, 100', 100" may thus alternatively or additionally base the estimation of the frequency error on other signals than CRS, in particular on a broadcast channel conveying system information from the eNB 200, such as a NB-PBCH, or on synchronization signals, such as PSS/SSS and/or NB-PSS/SSS. The estimation process itself may be based on known algorithms for frequency error measurement, e.g. based on correlation of signals, such as described in "Carrier Frequency Synchronization in the Downlink of 3GPP LTE", by Qi Wang, Christian Mehlfuhrer, and Markus Rupp, 2010 IEEE 21st International Symposium on Personal Indoor and Mobile Radio Communications (September 2010).

Figure 3:
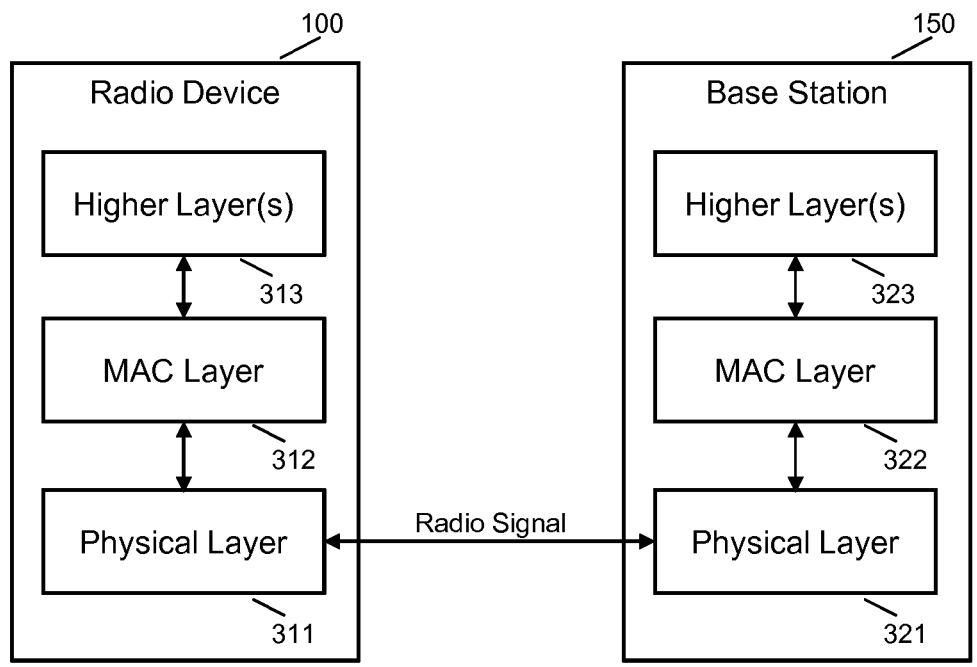
FIG. 3 shows an exemplary protocol layer stack which may be used for radio transmissions according to an embodiment of the invention.

FIG. 3 schematically illustrates a communication protocol architecture which may be applied for the transmission of the UL message 20 from the radio device 20 from the radio device 100 to the eNB 150. As illustrated, the protocol architecture includes a physical layer 311 in the radio device 100 and a physical layer 321 in the eNB 150. The physical layer encodes and modulates one or more transport blocks of the UL message 20 onto a radio signal which is received by the physical layer 321 of the eNB 150 and demodulated and decoded in a corresponding manner. As mentioned above, the transport block(s) are subjected to repeated transmission. The repeated transmissions may also involve redundancy version cycling of the transport block(s). A MAC (medium access control) layer of the radio device 100 is responsible for generating the transport block(s) from protocol data units provided by higher protocol layers 313, e.g., RLC (Radio Link Control) or PDCP (Packet Data Convergence Protocol). In the eNB 150, a MAC layer 322 is responsible for reassembling the received transport blocks to protocol data units of the higher protocol layers 323.

Figure 4:
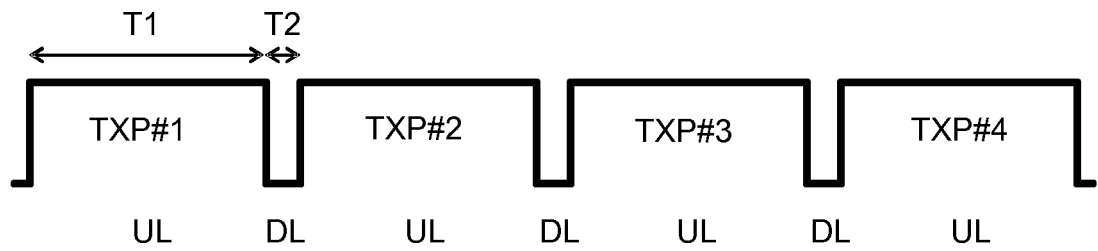
FIG. 4 schematically illustrates splitting of a repetitive transmission of an uplink message according to an embodiment of the invention.

As mentioned above, in the case of the radio device 100, which operates in half-duplex mode and cannot transmit and receive at the same time, estimating and compensating the frequency error is not possible while at the same time continuing with the repetitive transmission of the UL message 20. However, since the repetitive transmission may result in a rather long transmission duration, compensation of the frequency error is particularly relevant. In the concepts as illustrated herein this issue is addressed by splitting the repetitive transmission of the UL message 20 into multiple transmit periods and configuring measurement gaps between the transmit periods. An example of such splitting of the repetitive transmission of the UL message 20 is shown in FIG. 4, in which the transmit periods (TXP #1, TXP #2, TXP #3, TXP #4) have a duration of T1 and the measurement gap has a duration T2. During the measurement gaps, the radio device 100 switches to DL operation, e.g., using the switch 220, receives one or more DL signals, estimates and compensates the frequency error based on the received DL signal(s), and then switches back to continue with transmission of the next transmit period. The duration T1 of each transmit period may be configured in such a way that the frequency error does not exceed 0.1 ppm when the frequency of the local oscillator drifts during the duration T1 of the transmit period. Accordingly, if larger frequency errors are expected, e.g., because there are temperature variations or a low cost local oscillator is used, a shorter duration T1 of the transmit periods can be configured.

The transmit periods can be organized in various ways. For example, a single transport block could be split into smaller transport blocks. Each of these smaller transport blocks may then be transmitted repeatedly, with the measurement gaps being arranged therebetween. By way of example, a transport block of 1000 bit size could be split into 10 smaller transport blocks of 100 bit size. The eNB 150 may then schedule transmission of these smaller transport blocks using conventional scheduling mechanisms. The radio device 100 could then be configured with corresponding rules to take into account that the eNB 150 will not schedule UL transmissions exceeding a certain duration.

In some implementations such rules configured in the radio device could define that when a UL transmission of the radio device 100 is scheduled there is be a maximum duration (e.g., of T1) which the radio device 100 may continuously transmit and a minimum duration (e.g., of T2) that the radio device 100 needs to switch to the DL operation so that DL signals can be received.

In addition or as an alternative, transport block sizes signaled to the radio device 100, e.g. in UL grants conveyed by downlink control information, could be constrained in such a way that long UL transmissions are not possible. For example, the possible transport block sizes for UL transmissions could be reduced as the number of repetitions of the UL transmission increases.

In addition or as an alternative, the same transport block may be subjected to redundancy version cycling, and the measurement gaps may be arranged between transmissions of one or more redundancy versions. By way of example, a transport block of 1000 bit size could be mapped to 20 redundancy versions, and four redundancy versions could be transmitted in each transmit period.

In addition or as an alternative, the same transport block may be subjected to repetitive transmission, and the measurement gaps may be arranged between a certain number of repetitive transmissions. By way of example, a transport block of 1000 bit size could be repeated 200 times and a transmission gap inserted after every 50 transmissions.

In addition to utilizing the measurement gaps for estimation of the frequency error, the measurement gaps may also be used for other purposes. For example the radio device 100 may receive positive or negative acknowledgements (ACKs/NACKs) with respect to the ongoing repetitive transmission of the UL message 20. This acknowledgement information may be used for controlling early termination of the repetitive transmission. For example, if a certain number of repetitions is configured and the eNB 150 is able to successfully receive the UL message 20 already before the configured repetitions are completed, the eNB 150 may send a positive acknowledgement (ACK) in the measurement gap, and upon receiving the ACK, the radio device 100 may terminate the repetitive transmission, i.e., refrain from sending further repetitions.

In addition or as an alternative to sending the acknowledgement information, the measurement gaps may also be used for sending a pause indicator which causes the radio device 100 to suspend (i.e., temporarily stop). This pause may for example be used to schedule another radio device, e.g., one of the radio devices 100', 100", which might be more latency sensitive than the radio device 100, on the UL radio resources assigned to the repetitive transmission by the radio device 100.

In addition or as an alternative, the radio device 100 could also use the measurement gaps to decode other information from the received downlink signals, e.g., a ETWS (Earthquake and Tsunami Warning Signal) or a broadcast channel conveying system information.

The measurement gap is typically configured to provide sufficient time for the estimation of the frequency error, compensation of the frequency error, and Tx to Rx and Rx to Tx frequency switching and tuning. As mentioned above, for the frequency error estimation, the radio device 100 can use reference signals (e.g., CRS or NB-RS), synchronization signals (e.g., PSS/SSS or NB-PSS/SSS), and/or broadcast signals (e.g., PBCH or NB-PBCH). The radio device 100 can regenerate these signals to provide a phase reference, based on which the frequency error can be estimated.

Figure 5:
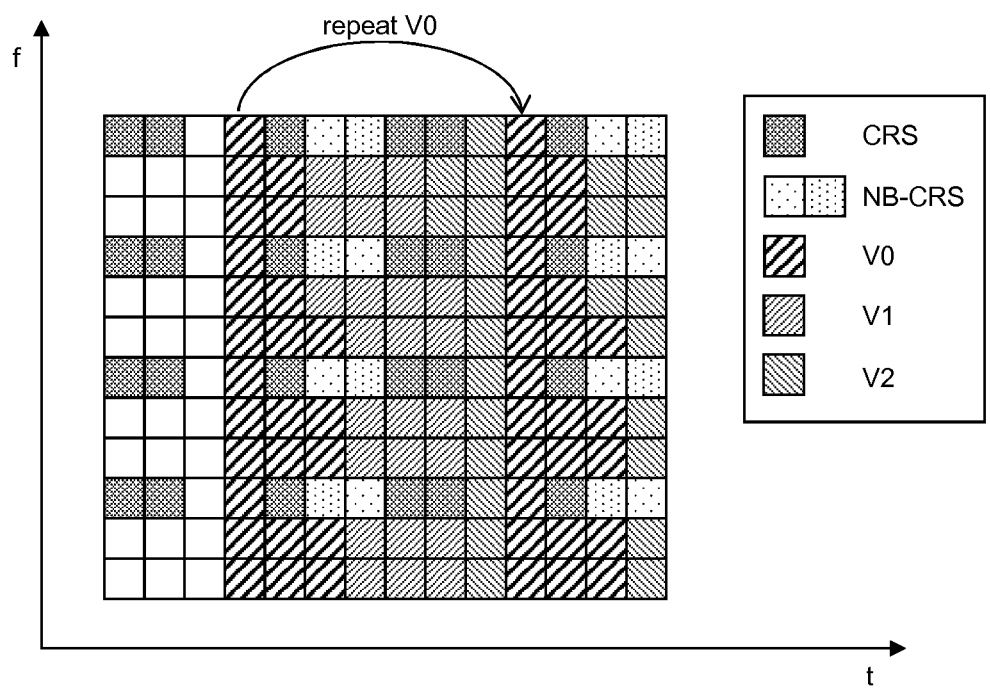
FIG. 5 shows an example of a mapping a broadcast channel to radio resource elements which may be used to enable frequency error estimation according to an embodiment of the invention.

When using the broadcast channel for purposes of frequency error estimation, the eNB 150 may tailor the transmission of the broadcast channel to enhance its usability for frequency error estimation. For example, during the measurement gap, the PBCH transmitted by the eNB 150 can be arranged in such a way that the output from its convolutional encoder is mapped to resource elements as shown in FIG. 5. In NB-IoT, the MIB (Master Information Block) carried by the NB-PBCH contains 50 information bits and a PRB (Physical Resource Block) containing the NB-PBCH can carry 200 bits. The output generated by the convolutional encoder can be divided into three versions—sometimes also referred to as blocks—, in FIG. 5 denoted as V0, V1, and V2, each of these versions containing, e.g., 50 encoded bits (e.g., 50 parity bits). One or more of the versions (in the illustrated example V0) can be repeated so that in total 200 encoded bits are produced that are mapped to 100 QPSK REs modulated by QPSK (Quadrature Phase Shift Keying).

Figure 10:
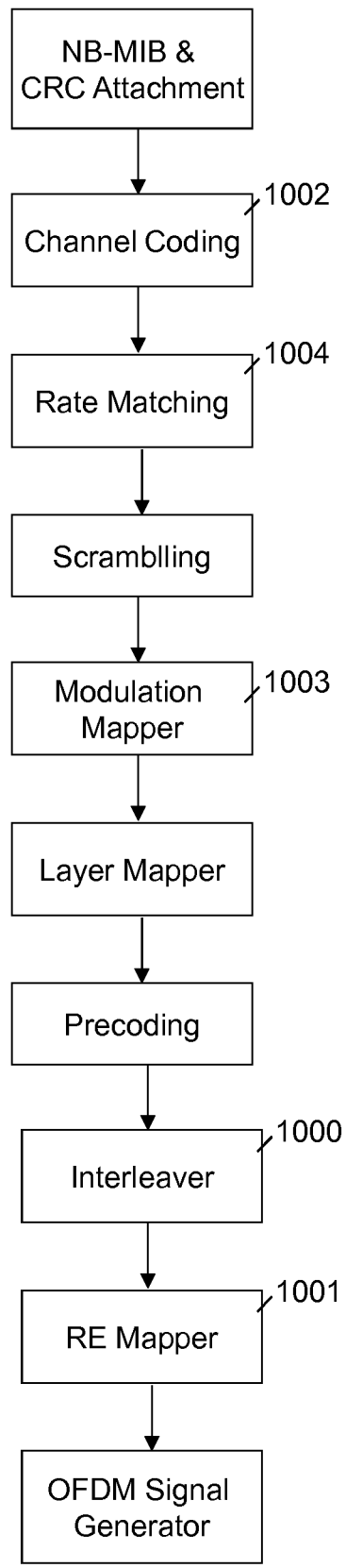
FIG. 10 is a schematic block diagram of NB-PBCH channel processing with an interleaver prior to an RE mapper.

Referring to FIG. 10: the position of the repeated signals may be controlled by using an interleaver 1000 prior to a PBCH resource element mapping stage 1001, e.g., using a "frequency first, time second" mapping algorithm. The location of the interleaver 1000 just prior to resource element mapping 1001 is an example location where the interleaver 1000 could be inserted. There are other potential locations where the interleaver 1000 could be inserted. The interleaver 1000 should be inserted somewhere after the channel coding function 1002, including before or after modulation mapping 1003, after rate matching 1004, etc. In some examples, the interleaver 1000 could be implemented via a modified interleaving algorithm within the rate matching function 1004, noting that the rate matching function may already contain an interleaver.

Turning again to FIG. 5, in the illustrated example, V0 can be used for frequency estimation by performing correlation across OFDM (Orthogonal Frequency Division Multiplexing) symbols for resource elements arranged on the same subcarriers. This correlation does not necessarily require regeneration (demodulation and/or decoding) of the PBCH. Accordingly, the frequency error estimation can be implemented with low complexity.

On the side of the eNB 150, the measurement gap may be considered in various ways. According to one option, the eNB 150 may be aware that the radio device 100 utilizes the measurement gap for frequency error estimation and thus not expect any useful signal from the radio device 100 during the measurement gaps. In reception processing for receiving the UL message 20, the eNB 150 may thus disregard signals received during the measurement gaps. However, such received signals may of course be considered for different purposes, e.g., reception of a UL transmission from another radio device. Depending on the overall length of the repetitive transmission, multiple measurement gaps may be inserted in the UL transmission, e.g., a number of M measurement gaps, each having a duration of T2. If the repetitive UL transmission (before splitting) has a duration of T0, the overall duration of the repetitive UL transmission including the measurement gaps would then be T0+M*T2, i.e., slightly increased as compared to a scenario without splitting the repetitive UL transmission and inserting the measurement gaps.

According to another option, the eNB 150 may again be aware that the radio device 100 utilizes the measurement gap for frequency error estimation and thus not expect any useful signal from the radio device 100 during the measurement gaps. Also in this case, the eNB 150 may thus disregard signals received during the measurement gaps in reception processing for receiving the UL message 20. However, in this option the repetitive UL transmission is generated in such a way that the overall duration of the repetitive UL transmission is the same as in a scenario without splitting the repetitive UL transmission and inserting the measurement gaps. This can be achieved by slightly reducing the number of repetitions.

According to another option, it is not required that the eNB 150 is aware that the radio device 100 utilizes the measurement gap for frequency error estimation. In this case, the eNB 150 will also consider signals received during the measurement gaps in reception processing for receiving the UL message 20. Since no useful signal from the radio device is present in the measurement gaps, these signals may appear as additional noise components. However, such additional noise components may be tolerable in view of the lower complexity of implementation.

Since during the measurement gaps the UL radio resources which are assigned to the radio device 100 for transmission of the UL message cannot be used by the radio device 100, resource efficiency can be improved by temporarily utilizing these UL radio resources for other purposes. For example, these UL radio resources may be used for transmission of UL control information by other radio devices, e.g., on a PUCCH (Physical Uplink Control Channel). According to another example, these UL radio resources may be used for a (short) transmission of an UL message by other radio devices, e.g., for a high-data rate transmission on a PUSCH. The latter option may particularly be useful in the case of other radio devices which require low latency.

In some scenarios, the measurement gaps may also be aligned with other UL signals. For example, in some scenarios the eNB 150 may simultaneously receive multiple repetitive UL transmissions with configured measurement gaps from different radio devices. In such cases, the measurement gaps of the different radio devices may be coordinated. For example, for some radio devices the measurement gaps may be arranged in one phase while for other radio devices the measurement gaps may be arranged in another phase. In an exemplary scenario, a first subset of radio devices could be configured with the measurement gaps in subframes 0-4 of a radio frame and with UL transmission periods in subframes 5-9 of the radio frame, while a second subset of radio devices could be configured with the measurement gaps in subframes 5-9 of the radio frame and with UL transmission periods in subframes 0-4. In this way, the eNB 150 can schedule the radio devices in an anti-phase manner and avoid time periods in which UL radio resources are left unused.

In some scenarios, the measurement gaps may also be coordinated with transmissions of reference signals by other radio devices, e.g., with transmissions of SRS (Sounding Reference Signals). In some examples, in order to avoid disturbing the frequency error estimation, it may be possible to avoid transmission of SRS by other radio devices during the measurement gaps.

In some scenarios, the measurement gaps may also be coordinated in such a way that they do not collide with resources of a random access channel, e.g., a PRACH (Physical Random Access Channel) or NB-PRACH (Narrow Band Physical Random Access Channel). This may be particularly relevant in scenarios where the NB-PUSCH and NB-PRACH share the same PRB, which is the case in many NB-IoT deployments. By way of example, in a system where PRACH resources occupy subframes 0 and 1 of all UL radio frames, the measurement gaps could be aligned with subframes 9, 0 and 1. In this case radio devices performing long repetitive UL transmissions may switch to DL operation in subframe 9, perform frequency estimation in subframe 0, e.g., based on the PBCH as explained in connection with FIG. 5, and then switch back to the UL operation in subframe 1.

In the above cases, explicit signaling of the measurement gap positions to the radio device 100 might not be needed because the measurement positions could be signaled implicitly by the positions of the UL signals they are aligned with. For example, the radio device 100 could derive the positions of the measurement gaps from the positions of SRS, PRACH resources, or the like.

In other cases, the eNB 150 may signal the positions or other configurations of the measurement gaps and UL transmission periods to the radio device 100. This may be accomplished in various ways. For example, the eNB 150 may use RRC (radio Resource Control) signaling to indicate the positions of the measurement gaps to the radio device 100. Alternatively or in addition, the eNB 150 may indicate the configuration of the measurement gaps by downlink control information, e.g., in connection with a UL grant assigning UL radio resources to the radio device 100. When using RRC signaling or downlink control information, the configuration of the measurement gaps can be signaled in a UE-specific manner, i.e., can be configured individually for the radio device 100.

Alternatively or in addition, the eNB 150 may indicate the configuration of the measurement gaps by broadcasted system information, e.g., in the MIB or an SIB (System Information Block). The eNB 150 may also indicate further information for configuring the measurement gaps to the radio device 100. For example, the eNB 150 could indicate to the radio device 100 that the measurement gaps should only be inserted if the expected duration of the repetitive UL transmission (without splitting) exceeds a threshold or if the expected frequency drift during the repetitive UL transmission (without splitting) exceeds a threshold. In some scenarios, the insertion of the measurement gaps could also depend on the expected size of the repetitive UL transmission (e.g., in terms of number of repetitions or number of bits). For example, the measurement gaps could be inserted only if the number of repetitions or transport block size, or a combination of number of repetitions and transport blocks size exceeds a threshold.

In some scenarios, the insertion of the measurement gaps may also be dependent on subcarriers that are assigned to the radio device 100. For example, the eNB 150 may reserve some subcarriers to be used by radio devices with high expected frequency drift. In an exemplary scenario, the eNB 150 could reserve five adjacent subcarriers and only assign the central subcarrier for UL transmissions from a radio device with high expected frequency drift. In this case, the frequency error could increase up to ±2 subcarrier spacings without interfering with UL transmissions by other radio devices. If the radio device 100 is scheduled on such frequency-drift tolerant subcarrier, it may refrain from inserting the measurement gaps. On the other hand, if the radio device 100 is scheduled on another subcarrier, the radio device 100 may insert the measurement gaps.

In some scenarios, the eNB 150 may reserve the subcarriers for implementing the frequency-drift tolerant subcarrier after the UL transmission by the radio device 100 with expected high frequency drift has started. For example, because the frequency error is still low at the start of the UL transmission, the eNB 150 may first assign only a first subcarrier to the radio device 100, without reserving any adjacent subcarriers to ensure frequency-drift tolerance. After a certain time, e.g., of 1 second, when the frequency error may have increased to ±1 subcarrier spacing, the eNB 150 may reserve second subcarriers adjacent on each side of the first subcarrier to ensure frequency-drift tolerance. Still later, e.g., after 2 seconds, when the frequency error may have increased up to ±2 subcarrier spacing, the eNB 150 may reserve third subcarriers adjacent on each side of the second subcarriers to ensure frequency-drift tolerance. This may be continued until the UL transmission is terminated or until no further subcarriers can be reserved. In the latter case, the radio device 100 could then continue the UL radio transmission with inserted measurement gaps.

In some scenarios, configuration of the measurement gaps, in particular the duration of the measurement gaps, may be indicated implicitly by a downlink control channel used for scheduling transmission of the UL message 20, e.g., by an NB-PDCCH. In particular, the NB-PDCCH may be configured with a repetitive search space, and the duration of the measurement gaps could depend on the number of repetitions configured for the NB-PDCCH search space, e.g., on a maximum number of repetitions denoted by Rmax. In the case of lower downlink signal quality, a higher number of repetitions would be used for the NB-PDCCH search space. At the same time, a longer duration of the measurement gaps could be configured to compensate for the lower downlink signal quality when estimating the frequency error. Accordingly, the duration of the measurement gaps may be set depending on downlink signal quality.

Further, the duration of the measurement gaps could also be configured depending on the PRACH coverage level, e.g., by selecting a longer duration for higher PRACH coverage levels.

In some scenarios, the radio device 100 may indicate to the eNB 150 whether it needs to insert the measurement gaps or not. For example, the radio device 100 could request configuration of the measurement gaps by the eNB 150. In this way, it could be taken into account that radio devices may vary with respect to the characteristics of their reference frequency sources, e.g., may use more or less accurate local oscillators. By way of example, if the radio device 100 is equipped with a highly accurate TCXO (Temperature Compensated Crystal Oscillator), the measurement gaps might not be needed. The radio device 100 could indicate corresponding information for consideration by the eNB 150, e.g., in device capability information or in terms of a corresponding device category. In other scenarios, the configuration of the measurement gaps could also be requested explicitly, e.g., by a corresponding RRC message.

In some cases, the radio device 100 could also implicitly indicate to the eNB 150 whether the measurement gaps are needed, e.g., by selecting specific resources when performing a random access procedure to access the cell of the eNB 150. For example, some resources of a PRACH (Physcial Random Access Channel) configured by the eNB 150 could be associated with a UE capability indicating the accuracy of the utilized reference frequency source, e.g. with a category "low frequency accuracy", and by using these resources to perform the random access procedure, the radio device 100 may indicate to the eNB 150 that the measurement gaps are needed. In some scenarios, there may also be different PRACH coverage levels, e.g., for the normal coverage, extended coverage, and extreme coverage as illustrated in FIG. 1, and by selecting a certain PRACH coverage level, e.g., the extreme PRACH coverage level, the radio device 100 could also indicate that the measurement gaps are needed. The eNB 150 could then react by providing control information for configuring the measurement gaps to the radio device 100.

Some PRACH resources could also be associated with low latency requests from the radio device 100. For example, if the radio device 100 has an alarm or other urgent UL message to send, it could use corresponding PRACH resources to access the cell. The eNB 150 could then react by scheduling the radio device 100 on a frequency-drift tolerant subcarrier, as explained above, so that the radio device 100 can send the urgent UL message without potentially increased latency due to insertion of the measurement gaps.

Figure 6:
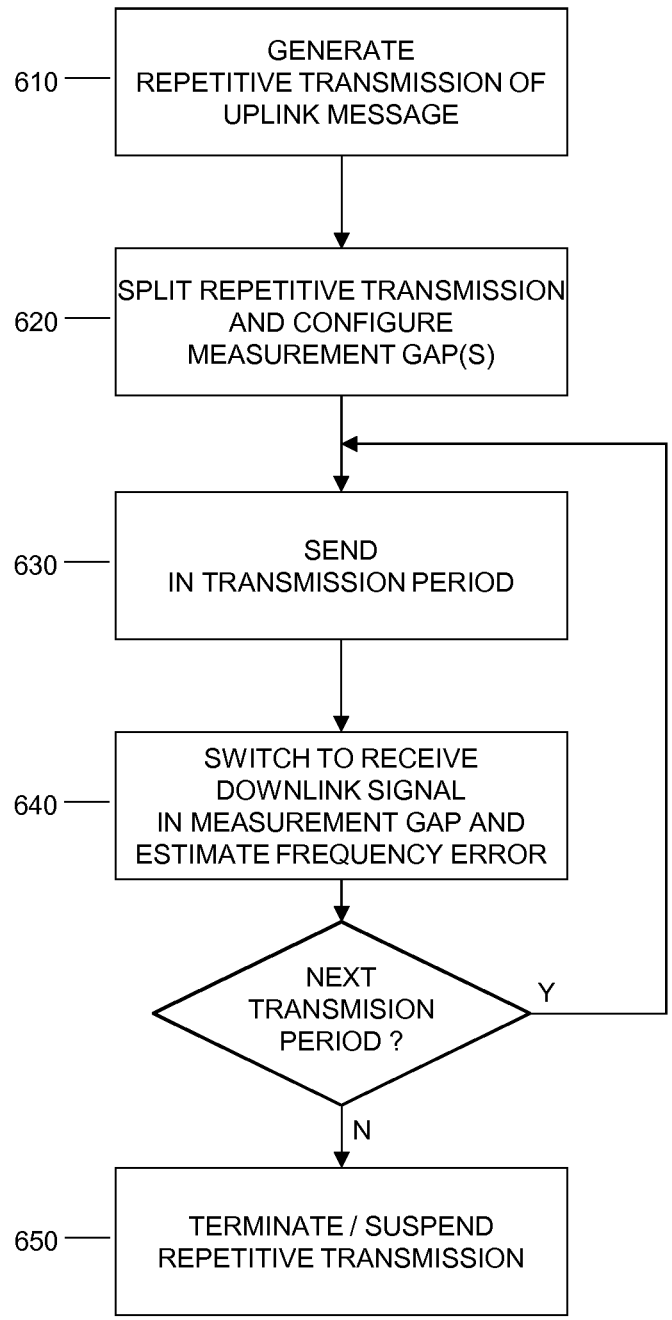
FIG. 6 shows a flowchart for illustrating a method according to an embodiment of the invention.

FIG. 6 shows a flowchart illustrating a method of controlling radio transmissions in a cellular network, by which a half-duplex radio device, e.g., the above-mentioned radio device 100, may implement concepts as described above. If a processor based implementation of the radio device is utilized, at least a part of the steps of the method may be performed and/or controlled by one or more processors of the radio device.

At step 610, the half-duplex radio device generates a repetitive transmission of a UL message to a base station of the cellular network, e.g., to the base station 150.

At step 620, the radio device splits the repetitive transmission of the UL message into a sequence of multiple transmit periods and configures at least one measurement gap between the transmit periods. The splitting of the repetitive transmission may be based on configuration information received by the radio device, e.g., from the base station. This configuration information could for example be explicitly signaled by RRC signaling, by downlink control information, or by broadcasted system information. However, this configuration information could also be implicitly indicated to the radio device, e.g., through allocation of certain radio resources. The configuration information may for example define the at least one measurement gap in terms of position and/or duration.

In some scenarios, the radio device may receive a downlink control channel from the base station and configure a duration of the at least one measurement gap depending on the downlink control channel. In particular, the duration of the at least one measurement gap may depend on a number of repetitions of a search space for transmission of the downlink control channel, in particular a part of the downlink control channel used for scheduling transmission of the uplink message. The number of repetitions may be considered in terms of a maximum number of repetitions. The downlink control channel may for example be an NB-PDCCH, and the duration of the at least one measurement gap may then depend on a number of repetitions of a search space candidate used for conveying a UL grant allocating UL radio resources for transmission of the UL message.

In some scenarios, the radio device may determine a frequency drift of the reference frequency source and configure a duration of the transmit periods depending on the frequency drift. While this may be accomplished locally at the radio device, the base station may also be involved in this configuration process. For example, the radio device could report or otherwise indicate the frequency drift to the base station, and the base station could then indicate corresponding configuration information to the radio device. As a general rule, in the case of larger frequency drift, shorter durations of the transmit periods may be used.

The UL message may correspond to a transport block conveyed on a physical layer transport channel. Accordingly, a single transport block may be split into multiple transmit periods. This may be accomplished on a physical layer of a communication protocol stack configured in the radio device. In some scenarios, the transport block may be mapped to a set of multiple redundancy versions, and each of the transmit periods could include a subset of one or more of the redundancy versions. Accordingly, redundancy version cycling may be used to further increase transmission reliability. In some scenarios, each of the transmit periods could also include a transport block of limited size, e.g., of 1000 bits or less, e.g. 500 bits, 200 bits, or 100 bits. A corresponding limitation of transport block size could be controlled depending on the expected duration of the repetitive transmission.

In the transmit periods, the radio device sends the repetitive transmission to the base station. In the at least one measurement gap configured between the transmit periods, the radio device temporarily switches to receiving at least one downlink signal from the base station and estimates a frequency error of a reference frequency source of the radio device. The reference frequency source may for example be formed by a local oscillator of the radio device. The reference frequency source may provide a carrier signal which is used as a basis for sending the repetitive transmission of the UL message.

The at least one downlink signal may include a broadcast signal conveying system information, e.g., a signal conveying a PBCH or an NB-PBCH. The radio device could then estimate the frequency error based on a repeated transmission of at least a part of the broadcast signal, e.g., as explained in connection with FIG. 5. For example, the system information could be transmitted in multiple versions or blocks; at least one of the versions could be transmitted repeatedly, e.g., as shown in FIG. 5 for the version V0, and the radio device could then estimate the frequency error based on the part of the broadcast signal which corresponds to the repeated transmission of the at least one version. Alternatively or in addition, the at least one downlink signal could also include at least one of a synchronization signal, e.g., a PSS/SSS or NB-PSS/SSS, and a reference signal, e.g., CRS or NB-RS.

As shown in FIG. 6, the sending of the split repetitive transmission may involve that at step 630 the radio device 100 sends a part of the repetitive transmission in one of the transmit periods, and then switches to receive the at least one downlink signal at step 640. At step 650, the radio device 100 may then check whether to continue with the repetitive transmission in the next transmit period by returning to step 630, as indicated by branch "Y". For example, if there are still outstanding parts of the repetitive transmission, i.e., if not all repetitions have been completed, the radio device 100 could return to step 630. On the other hand, if all repetitions have been completed, the radio device 100 may also decide to terminate the repetitive transmission, as indicated by step 650.

In some cases, the radio device may also terminate the repetitive transmission early, i.e., before all intended repetitions have been completed. For example, in the measurement gap the radio device could also receive downlink control information indicating whether the UL message was successfully received by the base station, and in the case of a positive acknowledgement (ACK) indicating that the UL message was successfully received, the radio device 100 could terminate the repetitive transmission and skip all further intended repetitions.

In some cases, downlink control information received by the radio device in the measurement gap may also include a pause indicator. In response to receiving the pause indicator, the radio device could decide at step 650 to suspend the repetitive transmission, i.e., to temporarily stop the repetitive transmission and continue the repetitive transmission at a later time.

Figure 7:
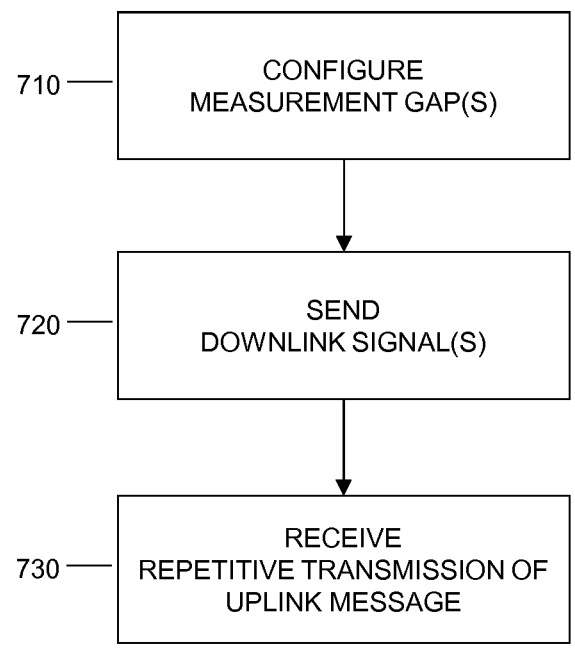
FIG. 7 shows a flowchart for illustrating a further method according to an embodiment of the invention.

FIG. 7 shows a flowchart illustrating a method of controlling radio transmissions in a cellular network, by which a base station, e.g., an eNB such as the above-mentioned eNB 150, may implement concepts as described above. If a processor based implementation of the base station is utilized, at least a part of the steps of the method may be performed and/or controlled by one or more processors of the base station.

At step 710, the base station may configure at least one measurement gap for splitting long repetitive transmissions by a half-duplex radio device, e.g., the above-mentioned half-duplex radio device 100, into multiple transmit periods. Configuration of these measurement gaps may involve sending corresponding configuration information to the radio device. This configuration information could for example be explicitly signaled by RRC signaling, by downlink control information, or by broadcasted system information. However, this configuration information could also be implicitly indicated to the radio device, e.g., through allocation of certain radio resources. The configuration information may for example define the at least one measurement gap in terms of position and/or duration. The configuration of the measurement gaps may also involve configuring a duration of transmit periods separated by the at least one measurement gap. In some scenarios, the base station may determine a frequency drift of a reference frequency source of the radio device, e.g., based on a report or other indication from the radio device, and configure a duration of the transmit periods depending on the frequency drift.

In some scenarios, base station may configure a duration of the at least one measurement gap by sending a downlink control channel to the radio device. In particular, the duration of the at least one measurement gap may depend on a number of repetitions of a search space for transmission of the downlink control channel, in particular a part of the downlink control channel used for scheduling transmission of the uplink message. The number of repetitions may be considered in terms of a maximum number of repetitions. The downlink control channel may for example be an NB-PDCCH, and the duration of the at least one measurement gap may then depend on a number of repetitions of a search space candidate used for conveying a UL grant allocating UL radio resources for transmission of the UL message.

E.g., the base station may configure the at least one measurement gap depending on a capability of the of the above-mentioned half-duplex radio device 100. E.g., the capability of the half-duplex radio device 100 may correspond to a quality of the XO. E.g., the quality of the XO may correspond to a frequency stability of the XO. Such a capability may be stored in a memory of the base station. It is also possible to determine the performance of the half-duplex radio device 100, e.g., depending on measurement reports received from the half-duplex radio device 100.

At step 720, the base station sends at least one downlink signal to the half-duplex radio device. The at least one downlink signal may include a broadcast signal conveying system information, e.g., a signal conveying a PBCH or an NB-PBCH. Alternatively or in addition, the at least one downlink signal could also include at least one of a synchronization signal, e.g., a PSS or SSS, and a reference signal, e.g., CRS or NB-RS.

At step 730, the base station receives a repetitive transmission of an UL message from the half-duplex radio device. The repetitive transmission of the UL message is split into a sequence of multiple transmit periods, and at least one measurement gap is configured between the transmit periods, e.g., based on the configuration performed at step 710.

In the measurement gap(s) the radio device temporarily switches to receiving the at least one downlink signal from the base station. This is done with the purpose of estimating a frequency error of a reference frequency source of the radio device. The base station may be aware of such operations performed by the radio device and utilize this awareness in reception processing for receiving the UL message. For example, the base station could disregard signals received in the at least one measurement gap. In other scenarios, awareness of the base station concerning the operations performed by the radio device in the measurement gap(s) may not be required.

In some cases, the radio device may estimate the frequency error based on a repeated transmission of at least a part of the broadcast signal, e.g., as explained in connection with FIG. 5. For example, the base station could transmit the system information in multiple versions or blocks; at least one of the versions could be transmitted repeatedly, e.g., as shown in FIG. 5 for the version V0, and the radio device could then estimate the frequency error based on the part of the broadcast signal which corresponds to the repeated transmission of the at least one version. E.g., it may be possible that a convolutional encoder at the base station generates the multiple versions.

In the at least one measurement gap, the base station may also send downlink control information to the radio device. The downlink control information may include acknowledgement information for acknowledging successful receipt of the UL message by the base station. In such cases, the base station may terminate the repetitive transmission of the UL message by configuring the acknowledgement information to indicate that the UL message was successfully received by the base station. In some scenarios, the downlink control information may also include a pause indicator for causing the radio device to suspend the repetitive transmission of the UL message. In the latter case, the base station may reallocate UL radio resources assigned to the repetitive transmission of the UL message while the repetitive transmission of the UL messages is suspended In some scenarios, the base station may coordinate the at least one measurement gap with one or more signals transmitted by one or more other radio devices. Such other signals may for example include reference signals, such as SRS, signals of a random access procedure, or signals conveying UL data. In some cases, this coordination may also involve that the base station schedules a UL transmission by another radio device in the at least one measurement gap. For example, this could be a short or low latency UL transmission. As mentioned above, it is also possible that for multiple radio devices performing long repetitive UL transmissions the measurement gaps and transmit periods are arranged in anti-phase.

The UL message may correspond to a transport block conveyed on a physical layer transport channel. Accordingly, a single transport block may be split into multiple transmit periods. This may be accomplished on a physical layer of a communication protocol stack configured in the base station. In some scenarios, the transport block may be mapped to a set of multiple redundancy versions, and each of the transmit periods could include a subset of one or more of the redundancy versions. Accordingly, redundancy version cycling may be used to further increase transmission reliability. In some scenarios, each of the transmit periods could also include a transport block of limited size, e.g., of 1000 bits or less, e.g. 500 bits, 200 bits, or 100 bits. A corresponding limitation of transport block size could be controlled depending on the expected duration of the repetitive transmission.

It is to be understood that the methods of FIGS. 6 and 7 may also be combined in a system including a base station operating according to the method of FIG. 7 and at least one radio device operating according to the method of FIG. 6.

Figure 8:
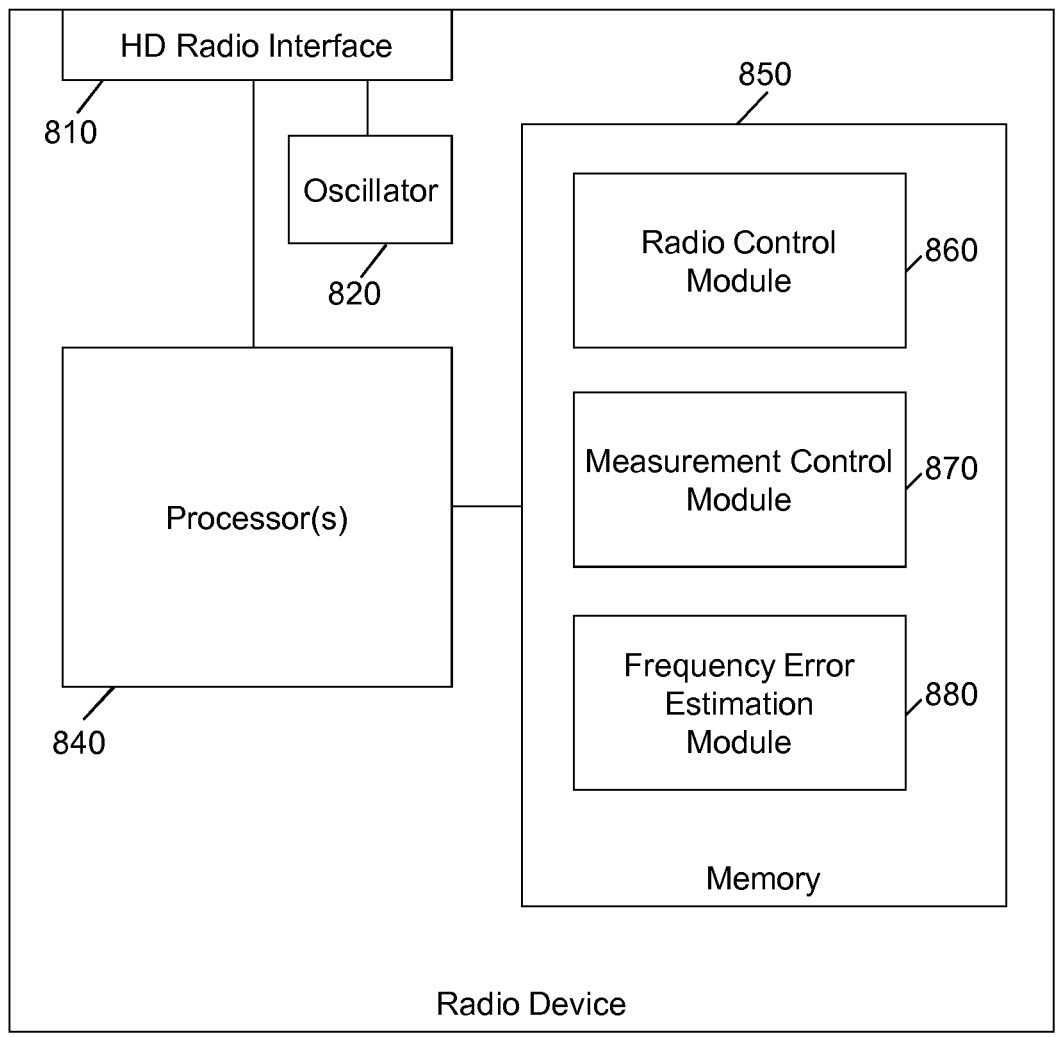
FIG. 8 schematically illustrates a processor-based implementation of a radio device according to an embodiment of the invention.

FIG. 8 shows a block diagram for schematically illustrating a processor based implementation of a radio device which may be utilized for implementing the above concepts. The radio device may for example correspond to an MTC device, in particular an NB-IoT radio device, such as the radio device 100 of FIG. 1.

As illustrated, the radio device includes a half-duplex radio interface 810. The radio device may utilize the radio interface 810 for connecting to a cellular network, e.g., through a base station of the cellular network, such as the eNB 150. The half-duplex radio interface 810 may for example be based on a transceiver architecture as illustrated in FIG. 2. Further, the radio device is provided with an oscillator 820 from which carrier frequencies and/or carrier signals used in radio transmissions through the radio interface 810 can be derived.

Further, the radio device is provided with one or more processors 840 and a memory 850. The radio interface 810, and the memory 850 are coupled to the processor(s) 840, e.g., using one or more internal bus systems of the radio device.

The memory 850 includes program code modules 860, 870, 880 with program code to be executed by the processor(s) 840. In the illustrated example, these program code modules include a radio control module 860, a measurement control module 870, and a frequency offset estimation module 880.

The radio control module 860 may implement the above-described functionalities of performing repetitive transmissions of data and receiving the broadcast signal. The measurement control module 870 may implement the above-described functionalities of configuring the measurement gap(s) to split long repetitive transmissions, and switching to receiving the downlink signal during the measurement gaps. The frequency error estimation module 880 may implement the above-described functionalities of estimating the frequency error from the downlink signal(s) received during the measurement gap(s).

It is to be understood that the structures as illustrated in FIG. 8 are merely exemplary and that the radio device may also include other elements which have not been illustrated, e.g., structures or program code modules for implementing known functionalities of a NB-IoT radio device or other type of UE.

Figure 9:
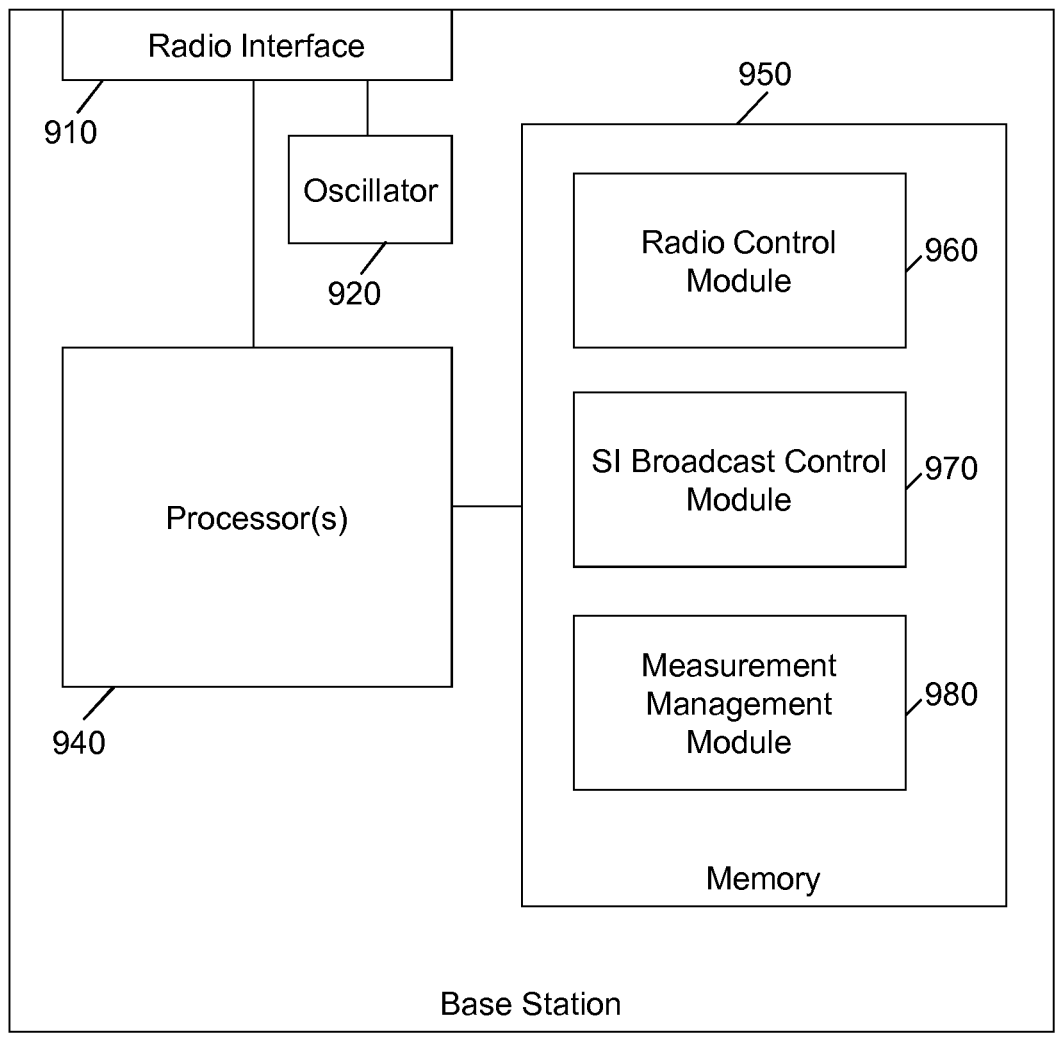
FIG. 9 schematically illustrates a processor-based implementation of a base station according to an embodiment of the invention.

FIG. 9 shows a block diagram for schematically illustrating a processor based implementation of a base station which may be utilized for implementing the above concepts. The base station may for example correspond to an eNB, such as the eNB 150 of FIG. 1.

As illustrated, the base station includes a radio interface 910. The base station may utilize the radio interface 910 for connecting to at least one half-duplex radio device, e.g., an NB-IoT radio device such as the radio device 100. Further, the base station is provided with an oscillator 920 from which carrier frequencies and/or carrier signals used in radio transmissions through the radio interface 910 can be derived.

Further, the base station is provided with one or more processors 940 and a memory 950. The radio interface 910, and the memory 950 are coupled to the processor(s) 940, e.g., using one or more internal bus systems of the base station.

The memory 950 includes program code modules 960, 970, 980 with program code to be executed by the processor(s) 940. In the illustrated example, these program code modules include a radio control module 960, an SI (System Information) broadcast control module 970, and a measurement management module 980.

The radio control module 960 may implement the above-described functionalities of performing transmissions of data and/or receptions of data. The radio control module may also be responsible for controlling the transmission of reference signals or synchronization signals, e.g., CRS, PSS, or SSS, by the base station. The SI broadcast control module 970 may implement the above-described functionalities of transmitting a broadcast signal conveying system information. The measurement management module 980 may implement the above-described functionalities of configuring the measurement gaps and controlling operation of the base station in accordance with the configured measurement gaps, e.g., by disregarding signals received during the measurement gaps or reallocating UL radio resources during the measurement gaps.

It is to be understood that the structures as illustrated in FIG. 9 are merely exemplary and that the base station may also include other elements which have not been illustrated, e.g., structures or program code modules for implementing known functionalities of a eNB or other type of base station.

It is to be understood that the concepts as explained above are susceptible to various modifications. For example, the concepts could be applied in connection with various kinds of radio technologies and radio devices, without limitation to MTC radio devices, NB-IoT radio devices, or the LTE radio technology. Further, it is to be understood that the illustrated concepts may also be combined with other techniques for estimating the frequency error.

It is to be understood that the concepts as explained above are susceptible to various modifications. For example, the decision logic for defining the at least one measurement gap can be located at the base station. The base station can inform the terminal about parameters of the measurement gap, e.g., a timing thereof, a start position, and/or and end position, etc. using a respective configuration information. The terminal can then implement these parameters by configuring the measurement gap accordingly. In further examples, the decision logic for defining the at least one measurement gap can be located, at least partly, at the terminal.

The invention claimed is:

1. A method of controlling radio transmission in a cellular network, the method comprising:
generating by a half-duplex radio device a repetitive transmission of an uplink message to a base station of the cellular network;
splitting by the half-duplex radio device the repetitive transmission of the uplink message into a sequence of multiple transmit periods and configuring by the half-duplex radio device at least one measurement gap between the transmit periods in accordance with pre-configured rules configured in the half-duplex radio device, the pre-configured rules defining a duration of the multiple transmit periods and of the at least one measurement gap;
sending by the half-duplex radio device in the transmit periods the repetitive transmission to the base station;
temporarily switching, by the half-duplex radio device in the at least one measurement gap configured between the transmit periods, the half-duplex radio device from the sending to receiving at least one downlink signal from the base station; and
estimating by the half-duplex radio device based on the received at least one downlink signal a frequency error of a reference frequency source of the half-duplex radio device.

2. The method according to claim 1, further comprising:
receiving by the half-duplex radio device in the at least one measurement gap downlink control information from the base station,
wherein the downlink control information comprises acknowledgement information for acknowledging successful receipt of the uplink message.

3. The method according to claim 2, further comprising:
terminating by the half-duplex radio device in response to the acknowledgement information indicating that the uplink message was successfully received by the base station, the repetitive transmission of the uplink message.

4. The method according to claim 1, further comprising:
receiving by the half-duplex radio device in the at least one measurement downlink control information from the base station, wherein the downlink control information comprises a pause indicator; and
suspending by the half-duplex radio device in response to receiving the pause indicator the repetitive transmission of the uplink message.

5. The method according to claim 1, wherein:
the uplink message corresponds to a transport block conveyed on a physical layer transport channel;
the transport block is mapped to a set of multiple redundancy versions; and
each of the transmit periods comprises a subset of one or more of the redundancy versions.

6. The method according to claim 1, wherein each of the transmit periods comprises a transport block conveyed on a physical layer transport channel.

7. The method according to claim 1, wherein:
the at least one downlink signal comprises a broadcast signal conveying system information; and
the method further comprises:
estimating by the half-duplex radio device the frequency error based on a repeated transmission of at least a part of the broadcast signal.

8. The method according to claim 7, further comprising:
transmitting the system information in multiple versions;
transmitting the at least one of the versions repeatedly; and
estimating by the half-duplex radio device the frequency error based on the part of the broadcast signal which corresponds to the repeated transmission of the at least one version.

9. The method of claim 1, further comprising:
generating the repetitive transmission in accordance with a scheduled uplink transmission that includes the multiple transmit periods.

10. The method of claim 1, wherein there is no explicit signaling by the base station of the position of the at least one measurement gap.

11. A method of controlling radio transmission in a cellular network, the method comprising:
sending by a base station of the cellular network at least one downlink signal to a half-duplex radio device; and
receiving by the base station a repetitive transmission of an uplink message from the half-duplex radio device,
wherein the repetitive transmission of the uplink message is split by the half-duplex radio device into a sequence of multiple transmit periods and at least one measurement gap being configured between the transmit periods in accordance with pre-configured rules configured in the half-duplex radio device, the pre-configured rules defining a duration of the multiple transmit periods and of the at least one measurement gap,
wherein the half-duplex radio device temporarily switches in the measurement gap from sending the repetitive transmission of the uplink message to receiving at least one downlink signal from the base station for estimating a frequency error of a reference frequency source of the half-duplex radio device.

12. The method according to claim 11, comprising:
in reception processing for receiving the uplink message, the base station disregarding signals received in the at least one measurement gap.

13. The method according to claim 11, comprising:
in the at least one measurement gap, the base station sending downlink control information to the radio device;
wherein the downlink control information comprises at least one of:
an acknowledgement information for acknowledging successful receipt of the uplink message by the base station; and/or
a pause indicator for causing the radio device to suspend the repetitive transmission of the uplink message.

14. The method according to claim 11, comprising:
the base station coordinating the at least one measurement gap with one or more signals transmitted by one or more other radio devices.

15. The method according to claim 11, comprising:
in the at least one measurement gap, the base station scheduling an uplink transmission by another radio device.

16. A radio device, comprising:
a half-duplex radio interface operable to connect the radio device with an associated cellular network;
a reference frequency source; and
one or more processors configured to:
generate a repetitive transmission of an uplink message to a base station of the associated cellular network;

split the repetitive transmission of the uplink message into a sequence of multiple transmit periods in accordance with pre-configured rules configured in the radio device, the pre-configured rules defining a duration of the multiple transmit periods and of the at least one measurement gap; and configure at least one measurement gap between the transmit periods;

transmit by the half-duplex radio interface in the transmit periods, the repetitive transmission to the base station;

temporarily switch the half-duplex radio interface in the at least one measurement gap configured between the transmit periods, from the sending to receiving at least one downlink signal from the base station; and estimate a frequency error of the reference frequency source based on the received at least one downlink signal signal.

17. A base station for a cellular network, the base station comprising:

a radio interface operable to connect the base station with a half-duplex radio device; and one or more processors configured to:
send at least one downlink signal to the half-duplex radio device; and
receive a repetitive transmission of an uplink message from the half-duplex radio device,
wherein the repetitive transmission of the uplink message is split by the half-duplex radio device into a sequence of multiple transmit periods and at least one measurement gap being configured between the transmit periods in accordance with pre-configured rules configured in the half-duplex radio device, the pre-configured rules defining a duration of the multiple transmit periods and of the at least one measurement gap,
wherein the half-duplex radio device temporarily switches in the measurement gap from sending the repetitive transmission of the uplink message to receiving the at least one downlink signal from the base station for estimating a frequency error of a reference frequency source of the half-duplex radio device.

\* \* \* \* \*